United States Patent
Leigh et al.

(10) Patent No.: US 10,473,871 B2
(45) Date of Patent: Nov. 12, 2019

(54) PRINTED CIRCUIT BOARD ASSEMBLY (71) Applicant: HEWLETT PACKARD ENTERPRISE DEVELOPMENT LP, Houston, TX (US)

(72) Inventors: Kevin B Leigh, Houston, TX (US); Paul Kessler Rosenberg, Sunnyvale, CA (US); George D Megason, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 207 days.

(21) Appl. No.: 15/112,363

(22) PCT Filed: Jan. 31, 2014

(86) PCT No.: PCT/US2014/013978
§ 371 (c)(1),
(2) Date: Jul. 18, 2016

(87) PCT Pub. No.: WO2015/116122
PCT Pub. Date: Aug. 6, 2015

(65) Prior Publication Data
US 2016/0334594 A1    Nov. 17, 2016

(51) Int. Cl.
*G02B 6/42* (2006.01)
*G02B 6/43* (2006.01)

(52) U.S. Cl.
CPC ........... *G02B 6/4292* (2013.01); *G02B 6/428* (2013.01); *G02B 6/4245* (2013.01);
(Continued)

(58) Field of Classification Search
CPC ..... G02B 6/3897; G02B 6/4261; G02B 6/421
See application file for complete search history.

(56) References Cited

U.S. PATENT DOCUMENTS

| 4,678,264 A | 7/1987 | Bowen et al. |
| 8,202,012 B2 | 6/2012 | Stewart et al. |

(Continued)

FOREIGN PATENT DOCUMENTS

WO    WO-2013162550    10/2013

OTHER PUBLICATIONS

International Searching Authority, The International Search Report and the Written Opinion, dated Mar. 17, 2015, 11 Pages.
(Continued)

*Primary Examiner* — Sung H Pak
*Assistant Examiner* — Hoang Q Tran
(74) *Attorney, Agent, or Firm* — Hewlett Packard Enterprise Patent Department (57) ABSTRACT

An optoelectronic assembly for a printed circuit board (PCB) assembly is described herein. The optoelectronic assembly may include a component carrier for mounting an active component, and a connector assembly for achieving a coupling between the component carrier and PCB-side optical infrastructure on a printed circuit board (PCB). The connector assembly can include a plurality of optical fibers connected to the component carrier, a first optical connector connected to the optical fibers for coupling with the PCB-side optical infrastructure on the PCB, and a housing member for housing the optical fibers and the first optical connector.

20 Claims, 9 Drawing Sheets

(52) U.S. Cl.
CPC ......... *G02B 6/4249* (2013.01); *G02B 6/4269* (2013.01); *G02B 6/4284* (2013.01); *G02B 6/43* (2013.01)

(56) References Cited

U.S. PATENT DOCUMENTS

| | | |
|---|---|---|
| 8,469,607 B2 | 6/2013 | Rosenberg et al. |
| 8,526,822 B2 | 9/2013 | Karnopp et al. |
| 2006/0056765 A1 | 3/2006 | Hwang et al. |
| 2007/0258683 A1* | 11/2007 | Rolston ................ G02B 6/4232 385/88 |
| 2008/0199187 A1 | 8/2008 | Andersson et al. |
| 2008/0274587 A1 | 11/2008 | Offrein et al. |
| 2009/0226130 A1 | 9/2009 | Doany et al. |
| 2011/0188815 A1* | 8/2011 | Blackwell, Jr. .......... H05K 1/11 385/88 |
| 2012/0281952 A1 | 11/2012 | McColloch et al. |
| 2013/0308912 A1 | 11/2013 | Avlonitis et al. |

OTHER PUBLICATIONS

Verdiell, J-M.; "Advances in Onboard Optical Interconnects: a New Generation of Miniature Optical Engines"; Nov. 26, 2012; 27 pages.

\* cited by examiner

PRINTED CIRCUIT BOARD ASSEMBLY

BACKGROUND

In recent years, transmission of signals at high data rates in communication systems, such as between components mounted on a printed circuit board (PCB) or on separate PCBs, has become a common practice. While generally electrical connections are used for the transmission of signals between the components, certain communication systems use optical infrastructure in addition to the electrical connections for transmitting the high data rate signals. The optical infrastructure, such as optical fibers, is able to achieve high data rates with substantially low losses and high signal integrity. Generally, for optically coupling two components, one end of an optical fiber is connected with each component using optical connectors.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components:

FIGS. 3B-1 and 3B-2 illustrate the various components of the PCB assembly, in accordance with another implementation of the present subject matter.

DETAILED DESCRIPTION

Generally, for optically connecting components on a printed circuit board (PCB), i.e., to provide for exchange of optical signals between the components, optical infrastructure, such as optical fibers and optical connectors, are used. In one example, an optical connector can be provided on each of the components and corresponding optical connectors can be provided on the optical fibers. Accordingly, the optical connectors can be coupled with the optical fibers to form a channel for achieving signal transmission at high data rates. For example, for optically coupling a chip package to PCB components, also referred to as active components, the optical connectors can be provided on the chip package and on the PCB component. The optical connectors can then be bridged using optical fibers having corresponding connectors.

Usually, the number of optical fibers, and therefore, the number of optical connectors used between the two components may vary, based on the components being connected and the application for which the two components are connected, for example, for power signal transmission or for data signal transmission. Generally, the connectors on the optical fibers have to be manually installed and engaged with the matching optical connectors on the components. In doing so, the time taken for assembly may be substantially high and the connections might not be reliable, for example, in case a large number of optical fibers are used. In addition, the optical fibers are prone to being damaged.

Generally, to simplify the assembly, the optical fibers can be integrally mounted on a supporting member, such as the PCB, on which the components to be connected are mounted. At one end, the optical fibers are connected to one component and, at the other end at which the optical fibers are integrated onto the supporting member, the connectors are provided for connecting to another component. As a result, the connection of the two components using the optical fibers becomes convenient and reliable. However, the optical fibers are still prone to being damaged during and after the connection is made.

In order to protect the optical fibers from damage, generally, the optical fibers are integrated with and housed in a pivotable connector mechanism mounted on the PCB. The pivotable connector mechanism can be moved about the pivot to optically connect or disconnect the components. However, such a pivotable connector mechanism is usually bulky and structurally complex. As a result, the cost of production of the connector mechanism is high which adds to the overall cost of the PCB having the connector mechanism with integrated optical fibers.

In another general mode of optically connecting the components on a PCB, the optical infrastructure, such as optical waveguides and fibers, may be integrally formed in the PCB, thereby, protecting the optical infrastructure from being damaged. The PCB in such a case is referred to as an optical-PCB (O-PCB). Further, in such a case, an optical module bearing the component, such as a processor, is coupled to the O-PCB to simultaneously form an electrical interface and an optical interface with the component. However, the cost of manufacturing the O-PCBs having integrated optical infrastructure is considerably higher than the electrical PCBs.

In addition, when the components, such as the processor, are electrically coupled to the O-PCB, for example, by soldering, the optical infrastructure may be affected and, in certain cases, may even be damaged. For example, the optical infrastructure may undergo a change in characteristics, or may be damaged as a result of thermal stresses due to heat or by debris produced during soldering of the components. Accordingly, the O-PCBs may not be usable for high volume and low cost applications. In addition to the above, in case the routing of the optical fibers or waveguides is to be changed, the O-PCB and the optical infrastructure have to be changed. For making such a change, the production infrastructure for the O-PCB may have to be changed and, therefore, can be cost intensive.

Aspects of the present subject matter are related to a printed circuit board (PCB) assembly and an optoelectronic assembly therefor, according to an implementation of the present subject matter. According to an aspect, the present subject matter provides for convenient assembly of active components of the optoelectronic assembly with a printed circuit board (PCB) through optical and electrical infrastructure to form the PCB assembly, and at the same time, protects the optical infrastructure from being damaged. Accordingly, in an example, the optoelectronic assembly can form an optical coupling as well as an electrical coupling with the PCB. In an example, the active component can include an active optical component. In said example, the active component can further include an active electronic component. For instance, the active electronic component can be an integrated circuit chip and the active optical component can be a photo-diode.

In one example, in the PCB assembly, the PCB can have the optical infrastructure provided thereon; such optical infrastructure provided on the PCB referred to as PCB-side optical infrastructure hereinafter. In said example, the optoelectronic assembly can be mounted on a first face of the PCB and can be coupled to the PCB-side optical infrastructure to form the optical coupling. According to said implementation, the optoelectronic assembly can include a component carrier for mounting the active component. Further, the optoelectronic assembly can include component-side optical infrastructure for optically coupling the active component on the component carrier to the PCB. In one example, the component-side optical infrastructure can include a plurality of optical fibers operatively coupled to the active component at one end and a first optical connector connected to the other end. The first optical connector at the other end can provide for coupling the optical fibers with the PCB-side optical infrastructure. In an example, the optical fibers can be directly coupled to the active component, whereas, in another example, the connector assembly can include a second optical connector for coupling the optical fibers to the active component. Further, the optoelectronic assembly can include a connector assembly for housing the component-side optical infrastructure.

Since the component-side infrastructure is housed in the connector assembly, the parts of the component-side infrastructure, such as the optical fibers, are protected from physical damage. For example, the connector assembly protects the component-side infrastructure from damage due to handling while coupling with the component carrier.

Further, in an example, the first optical connector can be a blind-mate connector. Accordingly, in said example, the optoelectronic assembly can be blind-mated with the PCB during production of the PCB assembly. In addition, the first optical connector can be a floating optical connector. As a result, the assemblage of the optoelectronic assembly with the PCB is relatively convenient and quick.

In an example, the PCB-side optical infrastructure can include a PCB-side optical connector, corresponding to the first optical connector, and a plurality of optical fibers extending from the PCB-side optical connector for connecting various electrical or optical components on the same PCB or another PCB to the PCB-side optical connector. Accordingly, the PCB-side optical infrastructure can facilitate the connection of the optoelectronic assembly to various electrical components or optical components or both on the same or separate PCB.

In one example, the PCB-side optical infrastructure can be provided on the same face of the PCB as the face on which the optoelectronic assembly is mounted, i.e., the first face. In another example, the PCB-side optical infrastructure can be provided on the opposite face of the PCB. In such an implementation, the PCB assembly can include an optical base layer provided on the second face of the PCB and housed by a base layer housing. For instance, the optical base layer can include the PCB-side optical infrastructure mounted on the second face of the PCB. In said implementation, the PCB-side components of the PCB assembly can be protected from being damaged during production of the PCB assembly, for example, due to mishandling of the PCB assembly. The provision of the PCB-side optical connector on the second face of the PCB and the base layer housing protects the optical base layer from damage and exposure during assembly as well as in the deployed state, for example, when the PCB assembly is deployed as an operational component in a system.

Further, the optoelectronic assembly can include a heat-sink mounted on the connector assembly and in contact with the active component on the component carrier. The provision of the heat-sink facilitates dissipation of heat from the active component during operation of the active component, thereby preventing overheating of the active component. In addition, since the heat-sink is provided on the connector assembly, the heat-sink provides additional protection to the component-side infrastructure, for example, to the optical fibers housed inside the connector assembly.

As mentioned previously, in addition to the optical coupling, the optoelectronic assembly can form electrical coupling with the PCB. Accordingly, in one case, the optoelectronic assembly can be mounted in a socket on the PCB to form the electrical coupling between an active electronic component among the active components and the PCB.

Further, according to an aspect, the optoelectronic assembly can provide for an additional electrical connection between the optoelectronic assembly and the PCB, other than the electrical coupling formed between the optoelectronic assembly and the socket in the PCB. For instance, a secondary electrical component of the optoelectronic assembly can be electrically coupled to the PCB. In an example, the secondary electrical component can be a component which is usually not a part of the optoelectronic assembly, such as a thermal sensor.

Accordingly, in an implementation, the connector assembly can include an electrical connector for coupling the secondary electrical component with the PCB; such electrical connector referred to as component-side electrical connector. In said implementation, the PCB can be provided with a corresponding PCB-side electrical connector to couple with the component-side electrical connector. In an example, the component-side or PCB-side electrical connector can be a floating electrical connector which provides for quick and easy assembly of the optoelectronic assembly. Further, in one example, the PCB-side electrical connector can be provided on the first face; in another, the PCB-side electrical connector can be provided on the second face of the PCB as part of the optical base layer.

Further, according to an aspect, the PCB assembly can be provided with guiding features, namely, a component-side guiding feature on the optoelectronic assembly and a PCB-side guiding feature on the PCB, for locating and aligning various parts during assembly. Accordingly, in an implementation, the component-side guiding feature can include an assembly guiding feature provided on the connector assembly to guide and align the optoelectronic assembly with respect to the PCB. The PCB-side guiding feature can include a corresponding alignment feature to cooperate with the assembly guiding feature to facilitate in the assembly of the optoelectronic assembly to the PCB. In one example, the corresponding alignment feature can be provided on the PCB. In another example, the corresponding alignment feature can be provided on the PCB-side optical infrastructure.

In addition, in one implementation, the PCB-side guiding feature can include a guiding feature provided on the socket of the PCB for aligning the optoelectronic assembly with respect to the PCB. In such an implementation, the corresponding component-side guiding feature on the optoelectronic assembly can include a secondary guiding feature on the connector assembly.

Further, in an implementation, the component-side guiding feature can include an electrical connector guiding feature on the component-side electrical connector and the PCB-side guiding feature can include a corresponding electrical connector guiding feature on the PCB-side electrical connector. The two features can cooperate for guiding, locating, and aligning the two electrical connectors during assembly. In another case, the component-side guiding feature can include the electronic connector guiding feature provided on the optoelectronic assembly, for example, on the connector assembly, instead of the component-side electrical connector. Such component-side and PCB-side guiding features on the optoelectronic assembly and the PCB, respectively, can assist in locating and facilitating the coupling of the optoelectronic assembly and the PCB in a reliable and convenient manner.

The above described PCB assembly and the optoelectronic assembly therefor are further described in the figures and associated description below. It should be noted that the description and figures merely illustrate the principles of the present subject matter. Therefore, various arrangements can be devised that, although not explicitly described or shown herein, embody the principles of the present subject matter. Moreover, all statements herein reciting principles, aspects, and implementations of the present subject matter, as well as examples thereof, are intended to encompass equivalents thereof.

Figure 1:
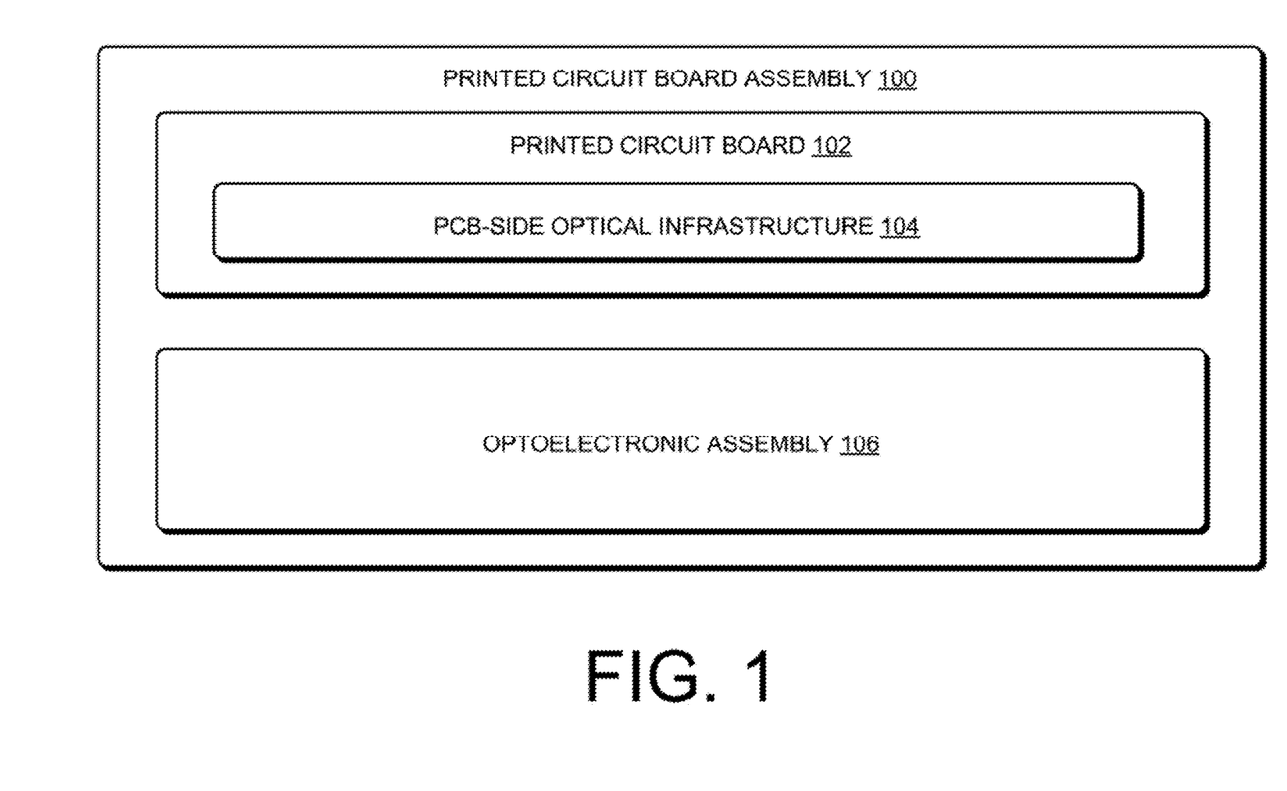
FIG. 1 illustrates a schematic of a printed circuit board (PCB) assembly, in accordance with an implementation of the present subject matter.

FIG. 1 illustrates a schematic of a printed circuit board (PCB) assembly 100, according to an implementation of the present subject matter. In said implementation, the PCB assembly 100 includes a printed circuit board (PCB) 102 having PCB-side optical infrastructure 104 mounted thereon. The PCB-side optical infrastructure 104 can be optically coupled to various components, such as integrated circuits, mounted on the PCB 102 or on different PCBs. The PCB assembly 100 can further include an optoelectronic assembly 106 mounted on the PCB 102 and operatively coupled to the PCB-side optical infrastructure 104. In one example, the optoelectronic assembly 106 of the PCB assembly 100 can be assembled before being coupled to the PCB 102. The optoelectronic assembly 106 is explained in detail with reference to FIG. 2.

Figure 2:
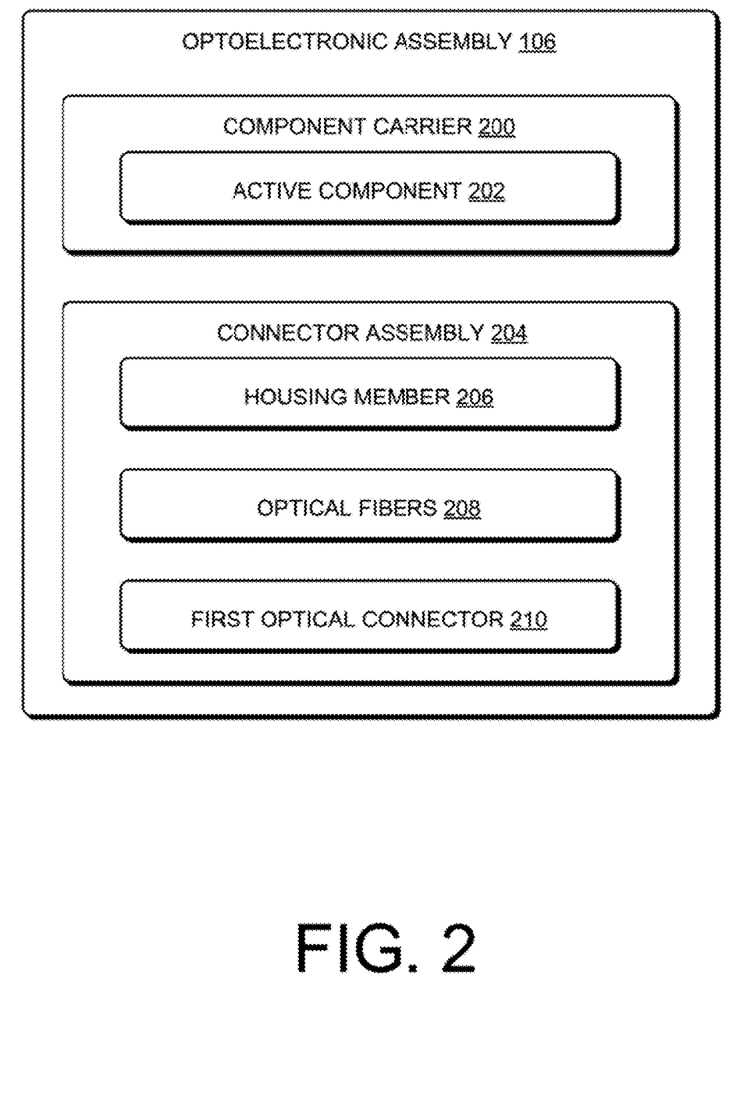
FIG. 2 illustrates a schematic of an optoelectronic assembly of the PCB assembly, in accordance with an implementation of the present subject matter.

FIG. 2 illustrates a schematic of the optoelectronic assembly 106 of the PCB assembly 100, in accordance with an implementation of the present subject matter. In said implementation, the optoelectronic assembly 106 includes a component carrier 200 for mounting an active component 202, and a connector assembly 204 for achieving a coupling between the component carrier 200 and the PCB-side optical infrastructure 104 on the PCB 102. In one example, the active component 202 can be an optical component and can be optically connected to the PCB 102 through the connector assembly 204. In another example, the active component 202 can be an electronic component, such as an integrated circuit (IC) chip, and the connector assembly 204 can provide for operatively connecting the active component 202 to the PCB 102.

In an implementation, the connector assembly 204 can include component-side optical infrastructure of the optoelectronic assembly 106 to serve as an optical bridge between the component carrier 200 and the PCB-side optical infrastructure 104. As an example, optical components provided on the optoelectronic assembly 106 are collectively referred to as the component-side optical infrastructure. In said implementation, the connector assembly 204 can further include a housing member 206 for mounting and integrating the component-side optical infrastructure. Such provision protects the component-side optical infrastructure from exposure and damage during handling and assembly of the optoelectronic assembly 106 to the PCB 102. In addition, the assemblage is simple and takes considerably less time.

In said implementation, the component-side optical infrastructure can include a plurality of optical fibers 208 connected to the component carrier 200 and optically coupled to the active component 202, such as the optical component. In addition, the component-side optical infrastructure can include a first optical connector 210 connected to the optical fibers 208 for coupling with the PCB-side optical infrastructure 104. In addition, in one example, the connector assembly 204 can include a second optical connector (not shown) for coupling the optical fibers 208 to the component carrier 200.

Figure 3A:
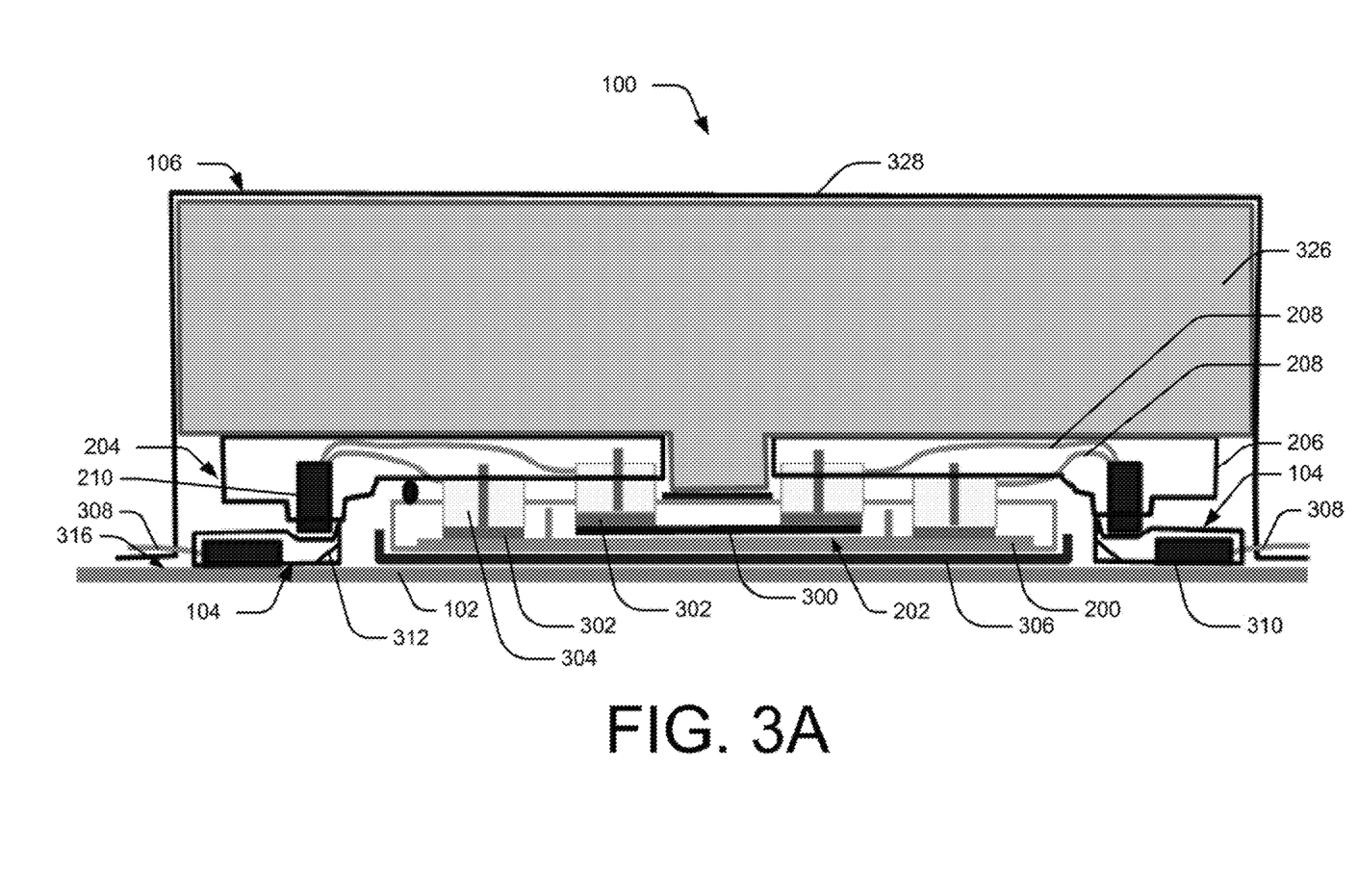
FIG. 3A illustrates a schematic showing various components of the PCB assembly, according to an implementation of the present subject matter.
Figure 3B:
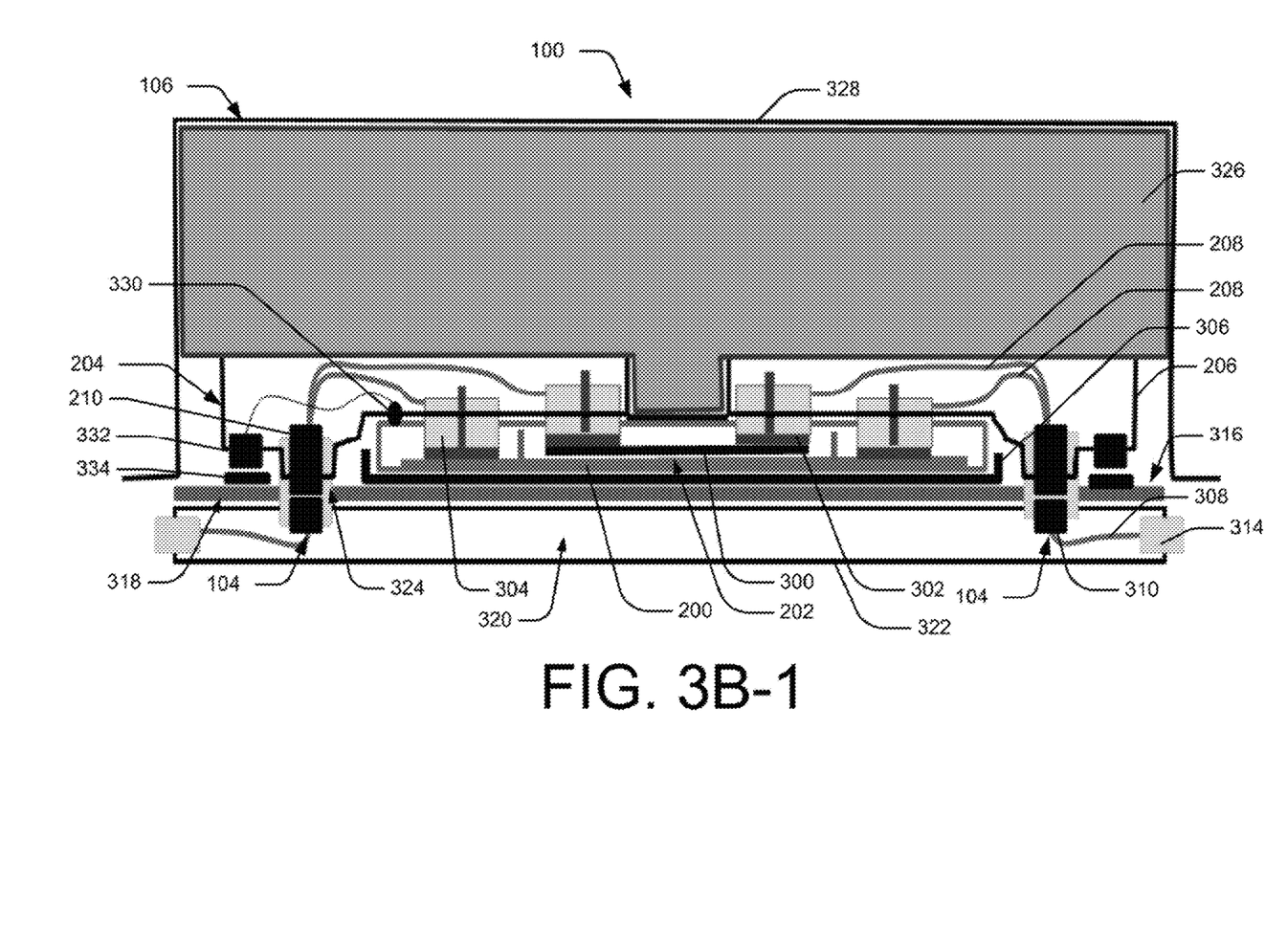
Figure 3B:
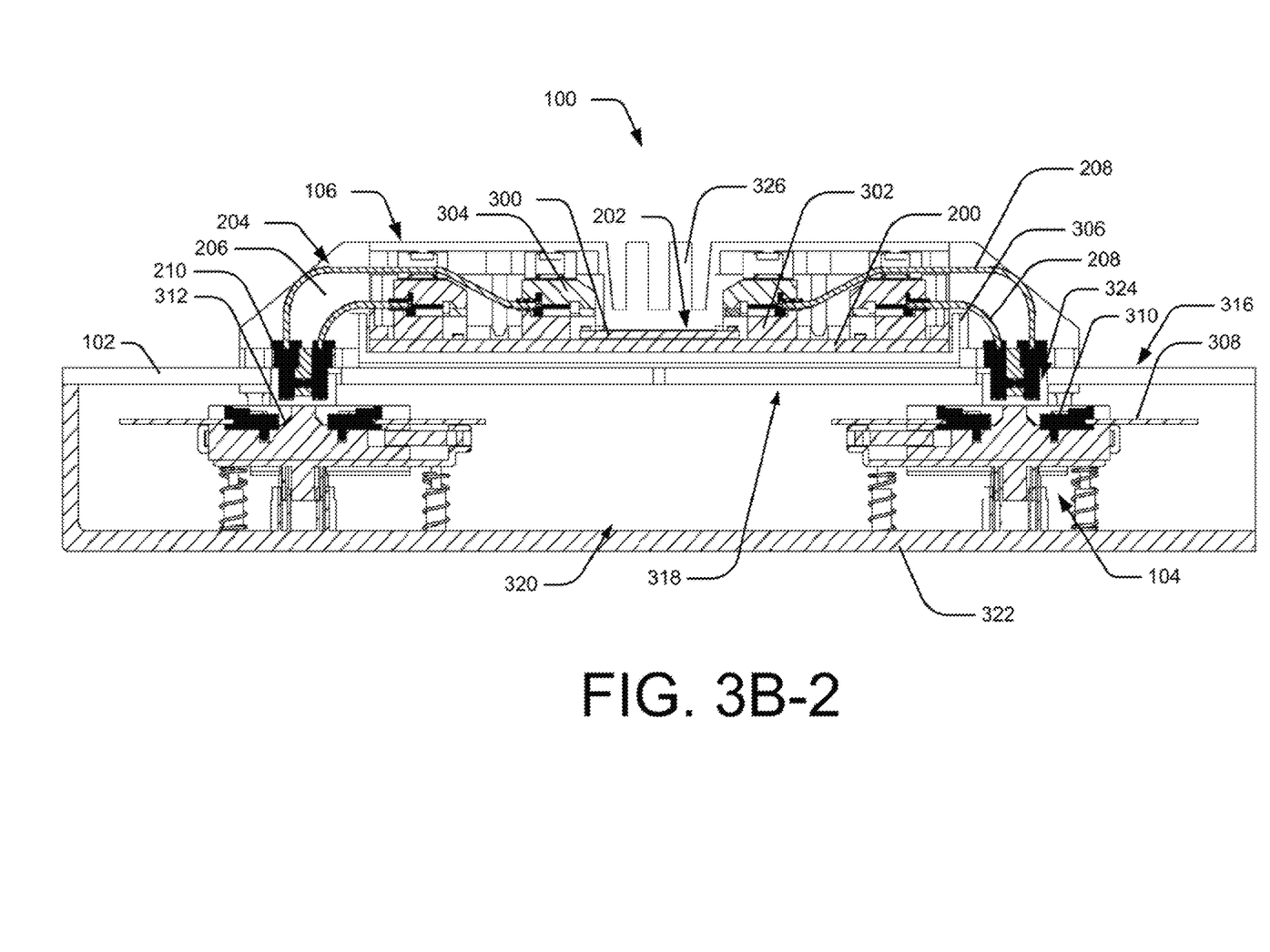

FIG. 3A illustrates a schematic showing various components of the PCB assembly 100, according to an implementation of the present subject matter. FIG. 3B-1 and FIG. 3B-2 illustrates various components of the PCB assembly 100, in accordance with another implementation. While FIG. 3B-1 shows a schematic of the PCB assembly 100, FIG. 3B-2 illustrates a cross-sectional view of the PCB assembly 100. For the sake of brevity, the description of FIG. 3A, FIG. 3B-1, and FIG. 3B-2 is provided in conjunction.

As mentioned previously, the optoelectronic assembly 106 includes the component carrier 200 and the connector assembly 204. In an example, the component carrier 200 can be a printed circuit board member carrying the active component 202. As mentioned previously, the active component 202 can include the active electronic component 300 and the active optical component 302. Further, the active electronic component 300 can be, for instance, an integrated circuit chip. On the other hand, the active optical component 302 can be, for example, a photo-diode or a laser.

In the above example, the optical fibers 208 of the component-side optical infrastructure can be integrated with the component carrier 200 and can be optically coupled to the active optical component 302 through the second optical connector 304. In such a case, the second optical connector 304 can be mounted on the component carrier 200 and the optical fibers 208 can be fixedly coupled to the second optical connector 304. In another case, the second optical connector 304 can be directly mounted on the active optical component 302. In such a case, the active optical component 302 can be, for example, a vertical-cavity surface-emitting laser (VCSEL) array or a photo detector array.

Further, in another example, the active electronic component 300 can be coupled to the optical fibers 208 of the component-side optical infrastructure for optical communication with the PCB-side optical infrastructure 104. In such a case, the optoelectronic assembly 106 can include convertor infrastructure (not shown) for coupling the active electronic component 300 optically to the PCB-side optical infrastructure 104. In one example, the active electronic component 300 may be a silicon photonics integrated circuit (IC), and the converter infrastructure can be a laser source coupled to the silicon photonics IC.

Further, in an implementation, the PCB 102 can be provided with a socket 306 for mounting the optoelectronic assembly 106 thereon during assembly. According to an aspect, the optoelectronic assembly 106 forms an electrical coupling with the PCB 102 through the socket 306. Accordingly, the electrical coupling between the active component 202, such as the active electronic component 300, and the PCB 102 is through the socket 306.

According to an aspect, the PCB-side optical infrastructure 104 of the PCB assembly 100 can include a plurality of optical fibers 308, a PCB-side optical connector 310, and optical signal guides 312 (shown in FIG. 3B-2). The optical fibers 308 can extend along the surface of the PCB 102 and can be coupled to various other electrical or optical components, for example, to be optically coupled to optical connectors 314. The optical signal guides 312 can provide for changing the direction of the optical signal being transmitted using the optical infrastructure, namely component-side optical infrastructure and the PCB-side optical infrastructure 104 of the PCB assembly 100. Further, the PCB-side optical connector 310 can interface with the first optical connector 210 to optically couple the active component 202, such as the active optical component 302, through the optical fibers 308.

Accordingly, the first optical connector 210 can connect to the PCB-side optical infrastructure 104 to form the optical coupling between the active component 202 and the PCB-side optical infrastructure 104. In an implementation, the first optical connector 210 and the PCB-side optical connector 310 can be blind-mate connectors and, accordingly, during assembly, the optoelectronic assembly 106 can be blind-mated to the PCB 102. In addition, according to an example, the first optical connector 210 and the PCB-side optical connector 310 can be floating optical connectors. In such a case, the alignment and assembly of the optical connectors 210, 310 is convenient.

Further, in one instance, the first optical connector 210 and the PCB-side optical connector 310 can be provided as optical ferrules. In said instance, the ferrules of the first optical connector 210 are vertically oriented and the optical ferrules of the PCB-side optical connector 310 are horizontally oriented, and in such a case, as shown in FIG. 3A, the optical signal guides 312 for changing the path of the optical signal are used. In another case, the optical ferrules of the PCB-side optical connector 310 may be vertically oriented to directly interface with the ferrules of the first optical connector 210, as shown in FIG. 3B.

In the implementation shown in FIG. 3A, the optoelectronic assembly 106 can be mounted on a first face 316 of the PCB 102 to form the PCB assembly 100. In such a case, the PCB-side optical infrastructure 104 on the first face 316 of the PCB 102 can be exposed and is prone to being damaged during assembly of the optoelectronic assembly to the PCB 102.

Accordingly, in another implementation as shown in FIG. 3B, the PCB-side optical infrastructure 104 can be provided on a second face 318 of the PCB 102. In said implementation, the PCB assembly 100 can include an optical base layer 320 formed on the second face 318 of the PCB 102. In an example, the optical base layer 320 can include the PCB-side optical infrastructure 104, and a base layer housing 322 for accommodating the PCB-side optical infrastructure 104.

In one implementation, the base layer housing 322 can be mounted on the second face 318 of the PCB 102 and can be used for mounting the PCB-side optical infrastructure 104. Accordingly, in one case, the PCB-side optical infrastructure 104 can be mounted to the second face 318 of the PCB 102 as shown in FIG. 3B-1, or to the floor of the base layer housing 322 as shown in FIG. 3B-2. In another case, the base layer housing 322 can be the supporting structure for mounting the PCB-side optical infrastructure 104 as well as the PCB 102. The provision of the optical base layer 320 in the PCB assembly 100 can prevent the PCB-side optical infrastructure 104, for example, the optical fibers 308, from exposure and possible damage.

Further, in an example, to keep the PCB-side optical infrastructure 104 accessible for connecting to the optoelectronic assembly 106, the PCB 102 can be provided with a window 324. For instance, the number of windows 324 can be the same as the number of first optical connectors 210. Accordingly, during assembly, the first optical connector 210 can be disposed in the window 324 for coupling to the PCB-side optical connector 310.

In addition, to provide further dissipation of heat from the component carrier 200 and the active component 202, the optoelectronic assembly 106 can be provided with a heat-sink 326. In an implementation, the heat-sink 326 can be mounted on the connector assembly 204 and can be in contact with the active component 202 or the component carrier 200 or both. In an example, the heat-sink 326 can be integrated to the connector assembly 204; in other examples, the heat sink 326 can be detachably coupled to the connector assembly 204 using a heat sink strap 328. The provision of the heat sink 326 on the connector assembly 204, in addition to facilitating heat dissipation, can provide additional protection to the component-end optical infrastructure. Further, the heat-sink 326 can serve as a support structure for the housing member 206 of the connector assembly 204 for mounting the component-end optical infrastructure.

In accordance with an implementation of the present subject matter, in addition to the electrical coupling formed between the optoelectronic assembly 106 and the socket 306, the PCB assembly can provide for another electrical coupling between the optoelectronic assembly 106 and the PCB 102. In an example, in case the optoelectronic assembly 106 includes a secondary electrical component 330 the provision of such other electrical coupling can be made in the PCB assembly 100. In an example, the secondary electrical component 330 can be a component which is usually not a part of the optoelectronic assembly 106, such as a thermal sensor. In one case, the thermal sensor can be provided for monitoring the temperature of the active component 202 and for, for example, regulating operational duration of the active component 202, to prevent overheating and possible damage.

In an implementation, to provide the other electrical coupling, the connector assembly 204 can include an electrical connector 332 for coupling the secondary electrical component 330 with the PCB 102; such electrical connector 332 referred to as component-side electrical connector 332 hereinafter. In said implementation, the PCB 102 can be provided with a corresponding PCB-side electrical connector 334 to couple with the component-side electrical connector 332. In an example, the component-side electrical connector 332 or PCB-side electrical connector 334 can be floating electrical connectors which provide for quick and easy assembly of the optoelectronic assembly 106 to the PCB 102.

Further, in accordance with the implementation shown in FIG. 3A, the PCB-side electrical connector 334 can be provided on the first face 316 of the PCB 102. The same implementation is also shown in FIG. 3B-1. On the other hand, as per another implementation (not shown in the figures), the PCB-side electrical connector 334 can be provided on the second face 310 of the PCB 102. In such a case, the optical base layer 320 can be referred to as an electro-optical layer instead.

In addition, in one case, the two electrical couplings, i.e., the one between the optoelectronic assembly 106 and the socket 306, and the other between the component-side electrical connector 332 and PCB-side electrical connector 334, can be different, for example, in terms of alignment, number of signals transmitted and, speed of signals transmitted.

In addition, according to an aspect of the present subject matter, the PCB assembly 100 can be provided with guiding features, namely, a component-side guiding feature (not shown) on the optoelectronic assembly 106 and a PCB-side guiding feature (not shown) on the PCB 102, for facilitating in locating and aligning various parts during manufacturing of the PCB assembly 100. The component-side guiding feature and the PCB-side guiding feature are explained later in detail with reference to FIG. 4A to FIG. 4D.

Figure 4A:
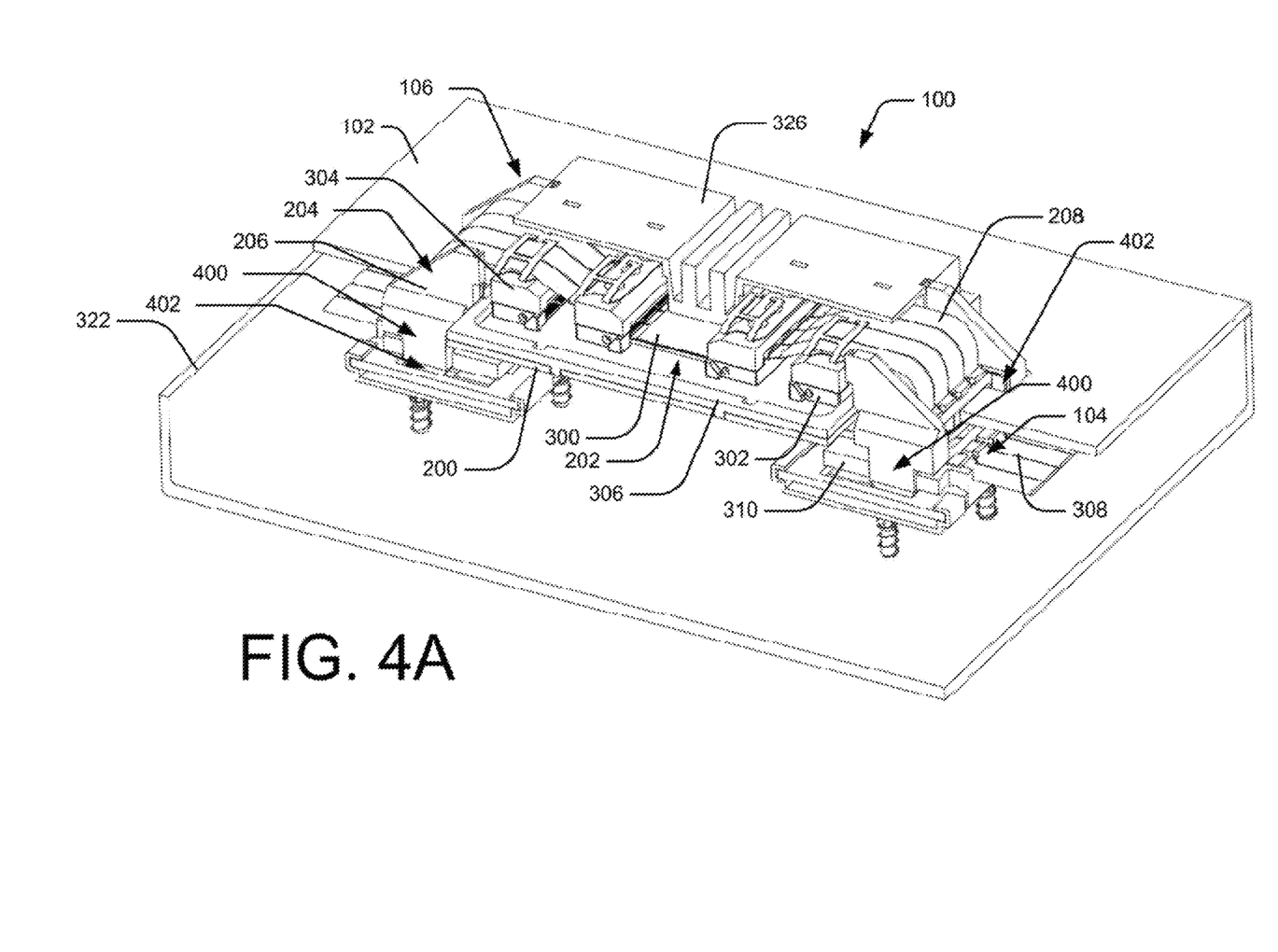
FIG. 4A to FIG. 4D illustrate perspective views of the PCB assembly, in accordance with an implementation of the present subject matter.
Figure 4B:
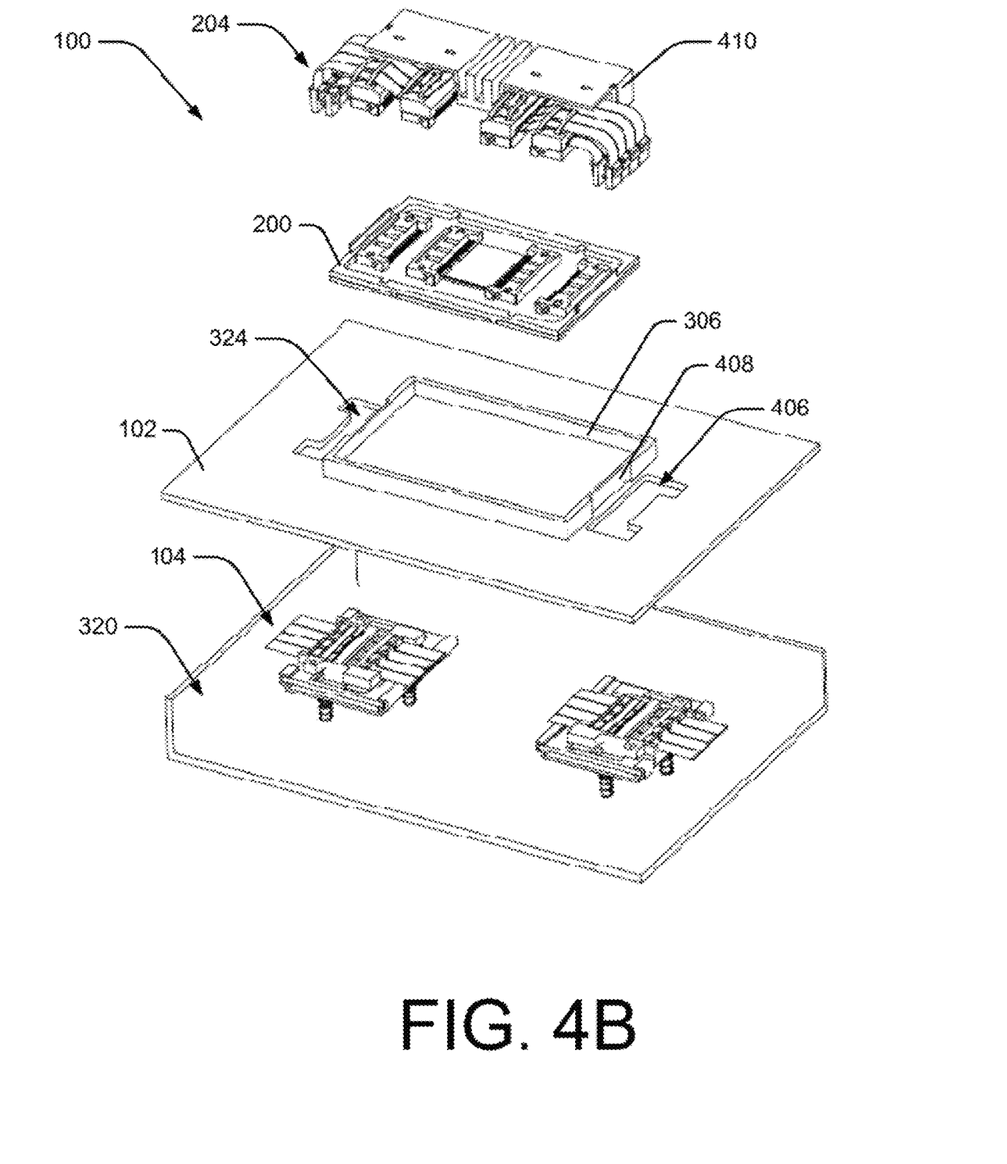
Figure 4C:
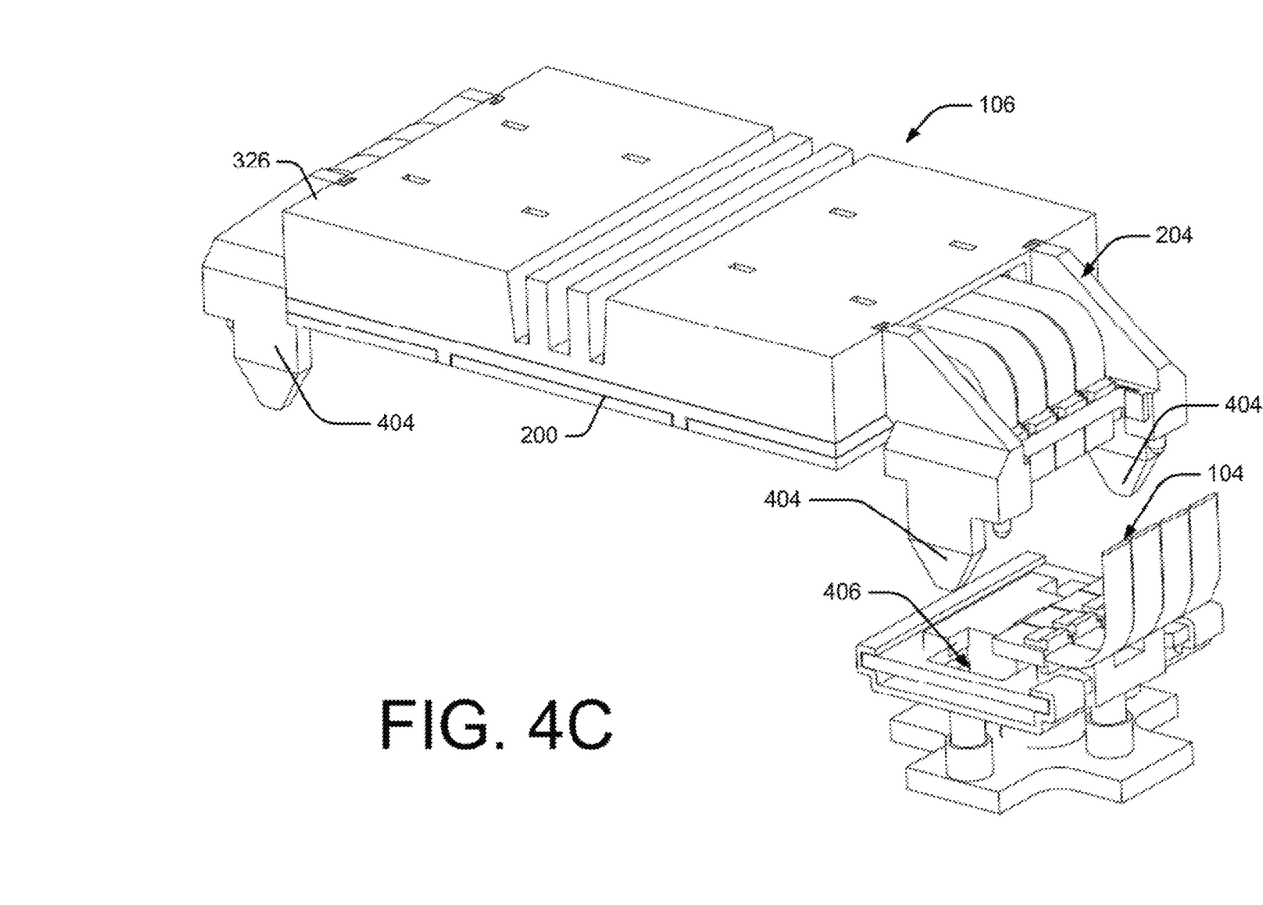
Figure 4D:
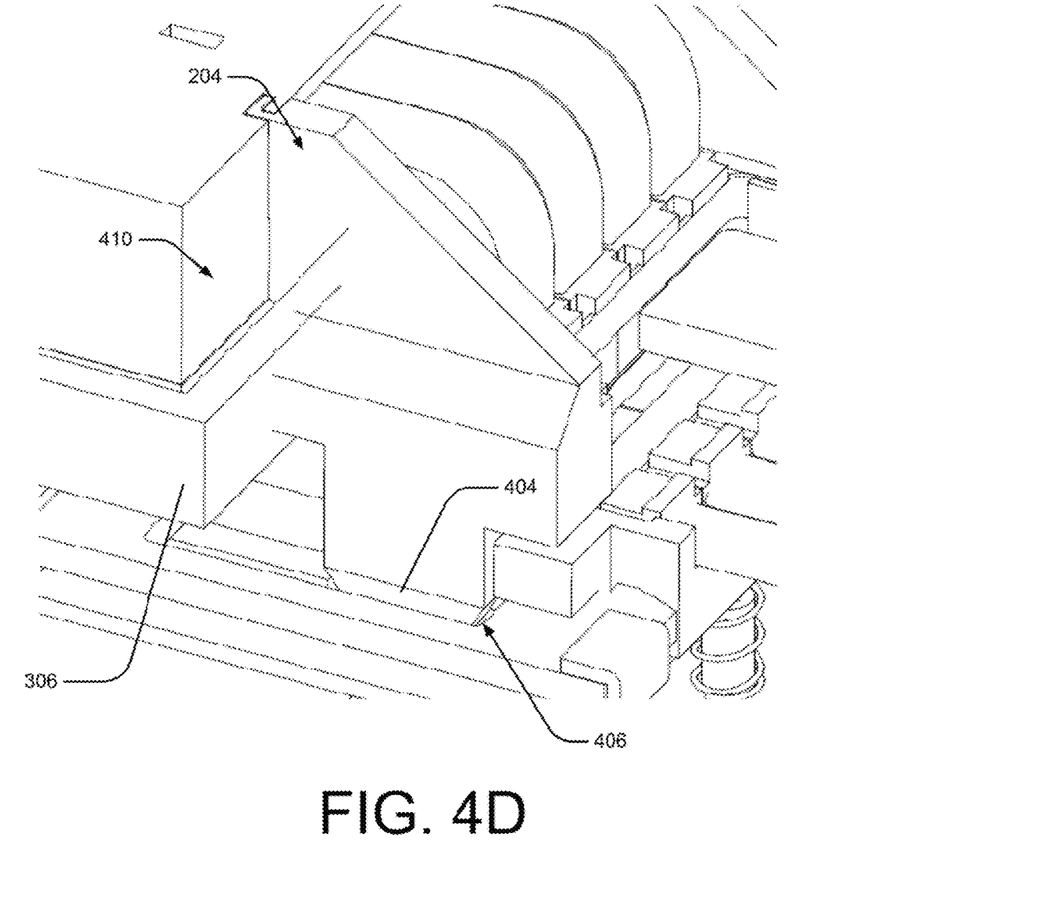

FIG. 4A to FIG. 4D illustrate various views of the PCB assembly 100, in accordance with an Implementation of the present subject matter. According to said implementation, while FIG. 4A illustrates a partial cross-sectional view of various parts of the PCB assembly 100, FIG. 4B illustrates an exploded view of the PCB assembly. Further, FIG. 4C illustrates the optoelectronic assembly 106 and the PCB-side optical infrastructure 104 in exploded view. For simplicity, the PCB 102 and the base layer housing 322 are not shown in FIG. 4C. FIG. 4D illustrates a magnified view of the coupling between the optoelectronic assembly 106 and the PCB-side optical infrastructure 104 in assembled state. For the sake of brevity, fabrication of the PCB assembly 100 is explained with reference to FIG. 4A and FIG. 4B taken in conjunction and the guiding features are explained with reference to FIG. 4A, FIG. 4B. FIG. 4C, and FIG. 4D taken in conjunction.

In one example, during assembly of various components of the PCB assembly 100, the optoelectronic assembly 106 is first assembled together. For instance, the connector assembly 204 having the component-side optical infrastructure mounted to the housing member 206 is disposed on the component carrier 200. According to the implementation shown in FIGS. 4A and 4B, the second optical connector 304 is coupled to the component carrier 200 or directly mounted on the active component 202, such as the active optical component 302, as the case may be. Further, in said example, the heat-sink 326 is mounted onto the connector assembly 204 to complete the construction of the optoelectronic assembly 106.

According to said example, the PCB 102 is formed as having the optical base layer 320. Accordingly, as mentioned previously, the PCB-side optical infrastructure 104 can be mounted to the second face 318 of the PCB; in another case, the PCB-side optical infrastructure 104 mounted to the second face 318 and the base layer housing 322. The PCB 102, as seen clearly from FIG. 4B, is provided with the windows 324 for optical coupling of the optoelectronic assembly 106 to the PCB-side optical infrastructure 104.

According to an aspect, when the optoelectronic assembly 106 is installed onto the PCB 102, the optoelectronic assembly 106 is mounted into the socket 306 and, at the same time, the optoelectronic assembly 106 is coupled to the PCB-side optical infrastructure 104. For example, the first optical connectors 210 suspended from the optoelectronic assembly 106 are connected to the PCB-side optical connectors 310. In addition, according to one implementation, the PCB-side electrical connector 334 is connected with the component-side electrical connector 332.

According to an aspect of the present subject matter, during the coupling of the optoelectronic assembly 106 and the PCB 102, three different types of connections are made between the optoelectronic assembly 106 and the PCB 102. In an example, one connection is the optical coupling between the first optical connectors 210 and the PCB-side optical connectors 310, the second connection is the electrical coupling between the PCB-side electrical connector 334 and the component-side electrical connector 332. And the third connection is the electrical coupling between the optoelectronic assembly 106 and the socket 306. In one case, the last coupling can be the one that is made to obstruct any relative motion between the optoelectronic assembly 106 and the PCB 102, for example, the third coupling.

Further, as mentioned above, the guiding features, namely the component-side guiding feature 400 and the PCB-side guiding feature 402 of the PCB assembly 100 facilitate in fabrication. In an implementation, the component-side guiding feature 400 can include an assembly guiding feature 404 provided on the connector assembly 204 to guide and align the optoelectronic assembly 106 with respect to the PCB 102. In an example, the assembly guiding feature 404 can be formed as a chamfered pin, as seen clearly in FIG. 4B and FIG. 4C. Accordingly, the PCB-side guiding feature 402 can include a corresponding alignment feature 406 to cooperate with the assembly guiding feature 404 to facilitate in the assembly of the optoelectronic assembly 106 to the PCB 102. In accordance with the above example, the corresponding alignment feature 406 can be the window 324 formed on the PCB 102. In another example, the corresponding alignment feature 406 can be provided on the PCB-side optical infrastructure 104.

In addition, in one implementation, the PCB-side guiding feature 402 can include a guiding feature 408 provided on the socket 306 of the PCB 102 for aligning the optoelectronic assembly 106 with respect to the PCB 102. In such an implementation, the corresponding component-side guiding feature 400 on the optoelectronic assembly 106 can include a secondary guiding feature 410 on the connector assembly 204.

Further, in an implementation, the component-side guiding feature 400 can include electrical connector guiding feature (not shown) on the component-side electrical connector 332 and the PCB-side guiding feature 402 can include a corresponding electrical connector guiding feature (not shown) on the PCB-side electrical connector 334. The two electrical connector guiding features can cooperate for guiding, locating, and aligning the two electrical connectors 332 and 334 during assembly. In one example, the electrical connector guiding features on the two connectors 332 and 334 can be similar in construction to the assembly guiding feature 404 and the corresponding alignment feature 406, as described above. Further, in another implementation, the component-side guiding feature 400 can include the electronic connector guiding feature provided on the optoelectronic assembly 106, for example, on the connector assembly 204, instead of the component-side electrical connector 332.

Although implementations of the printed circuit board (PCB) assembly 100 and the optoelectronic assembly 106 therefor have been described in terms of certain structural features and/or methods, the present subject matter is not limited to the features or methods described. Rather, the features and methods are disclosed and explained in the context of a few implementations of the printed circuit board (PCB) assembly 100 and the optoelectronic assembly 106 therefor.

We claim:

1. An optoelectronic assembly for a printed circuit board (PCB) assembly, the optoelectronic assembly comprising:
   an active component;
   a component carrier separate from a PCB of the PCB assembly, the active component mounted on and electrically connected to the component carrier; and
   a connector assembly for achieving a coupling between the component carrier and a PCB-side optical connector on the PCB that is separate from the component carrier, the connector assembly comprising, a plurality of optical fibers connected to the component carrier;

a first optical connector connected to the plurality of optical fibers, the first optical connector having a mating surface that faces downwardly from a bottom side of the optoelectronic assembly, the mating surface of the first optical connector to mate with an upwardly facing mating surface of the PCB-side optical connector mounted on and in physical contact with the PCB; and a housing member housing the plurality of optical fibers and the first optical connector.

2. The optoelectronic assembly of claim 1, wherein the first optical connector is a blind-mate connector to blind mate with the PCB-side optical connector on the PCB.

3. The optoelectronic assembly of claim 1, wherein the first optical connector is a floating optical connector.

4. The optoelectronic assembly of claim 1, wherein the connector assembly further comprises a component-side electrical connector for coupling a secondary electrical component in the optoelectronic assembly with the PCB.

5. The optoelectronic assembly of claim 4, wherein the component-side electrical connector is a floating electrical connector.

6. The optoelectronic assembly of claim 1, further comprising a heat-sink mounted on the connector assembly and in contact with the active component on the component carrier.

7. The optoelectronic assembly of claim 1, further comprising a component-side guiding feature for aligning and guiding the optoelectronic assembly for mounting on the PCB.

8. The optoelectronic assembly of claim 1, wherein the connector assembly further comprises a second optical connector connecting the plurality of optical fibers to the component carrier.

9. A printed circuit board (PCB) assembly comprising:
a printed circuit board (PCB) having a PCB-side optical infrastructure comprising a PCB-side optical connector mounted on and in contact with a surface of the PCB;
an optoelectronic assembly comprising:
a component carrier for mounting an active component, the component carrier separate and spaced apart from the PCB; and
a connector assembly comprising,
a plurality of optical fibers connected to the component carrier;
a first optical connector connected to the plurality of optical fibers and optically mated to the PCB-side optical connector on the PCB; and
a housing member that houses the plurality of optical fibers and the first optical connector.

10. The PCB assembly of claim 9, wherein the optoelectronic assembly is mounted on a first face of the PCB, and the PCB assembly further comprises an optical base layer provided on a second face of the PCB, the optical base layer comprising the PCB-side optical connector.

11. The PCB assembly of claim 9, further comprising an optical fiber connected to the PCB-side optical connector on the PCB.

12. The PCB assembly of claim 9, wherein the connector assembly further comprises a component-side electrical connector coupling a secondary electrical component in the optoelectronic assembly with the PCB.

13. The PCB assembly of claim 9, wherein the connector assembly further comprises a component-side guiding feature to guide and align the optoelectronic assembly with respect to the PCB.

14. The PCB assembly of claim 13, wherein the PCB comprises a PCB-side guiding feature corresponding to the component-side guiding feature to guide and align the optoelectronic assembly with respect to the PCB.

15. The PCB assembly of claim 9, wherein the PCB comprises a window through the PCB, the first optical connector extending through the window to mate the PCB-side optical connector.

16. The PCB assembly of claim 9, wherein the PCB comprise an electrical socket that electrically receives the optoelectronic assembly, and wherein the electrical socket includes an alignment feature that aligns the optoelectronic assembly to the PCB.

17. The PCB assembly of claim 9, wherein the optoelectronic assembly comprises a heat sink to provide heat dissipation of the active component.

18. The PCB assembly of claim 9, wherein the plurality of optical fibers are to provide optical communication with the active component.

19. The PCB assembly of claim 9, wherein the optoelectronic assembly further comprises a second optical connector within the housing member, the second optical connector connecting the plurality of optical fibers to the component carrier.

20. The PCB assembly of claim 9, wherein the first optical connector has a mating surface that faces downwardly, the mating surface mating with an upwardly facing mating surface of the PCB-side optical connector that is in physical contact with the PCB.

* * * * *